MURREL D. SLAYDEN,
HUGH W. STALEY
INVENTOR.(S)

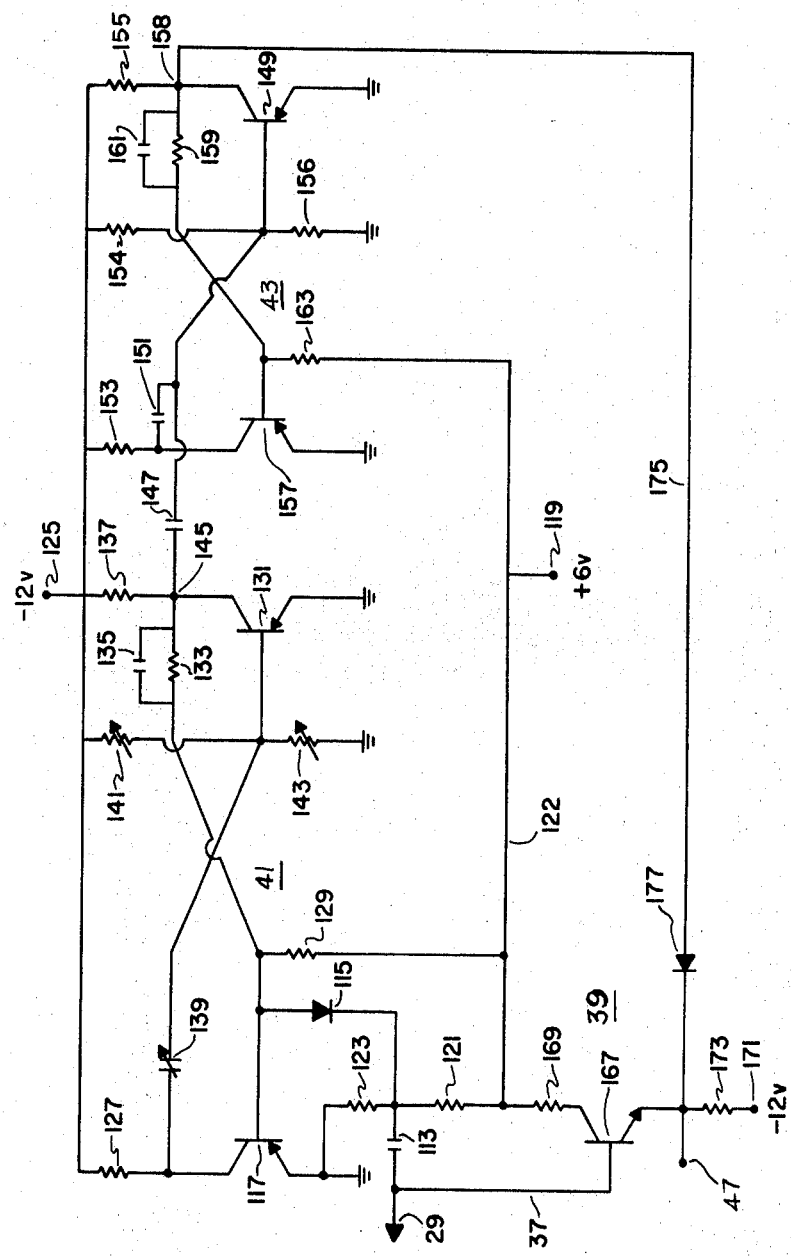

United States Patent Office 3,535,644
Patented Oct. 20, 1970

3,535,644
PULSE AMPLITUDE AND WIDTH DETECTOR
Murrel D. Slayden, Huntsville, Ala., and Hugh W. Staley, Clearwater, Fla., assignors to the United States of America as represented by the Administrator of the National Aeronautics and Space Administration
Filed July 28, 1967, Ser. No. 656,952
Int. Cl. H03k 5/20
U.S. Cl. 328—110                                       5 Claims

ABSTRACT OF THE DISCLOSURE

An apparatus for detecting pulses which exceed a predetermined amplitude and width including a phase splitter for applying the pulse in opposite polarity to a first and second trigger circuit having their threshold levels individually adjustable to predetermined amplitudes of the same polarity. An OR gate applying the output of the trigger circuit whose threshold is exceeded to a width generator for activating a gate generator a predetermined time after the threshold level of either the first or second trigger circuit is exceeded. An AND gate for passing the output of the OR gate during the time period that gate generator is activated.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates generally to electrical testing apparatus and more particularly to a system for evaluating the amplitude and width of an electrical transient pulse to determine whether the transient pulse exceeds predetermined tolerance limits.

As the development of space vehicles has progressed in size and complexity, the complexity of verifying the flight readiness of each vehicle has increased. Of particular concern has been the detection of undesirable transients that exceed a certain set voltage level and pulse width so as to cause a malfunction of an electrical relay or a similar device having a voltage-time response characteristic.

The increase in the complexity of detecting such transients has resulted, in part, from the greater probability that electrical systems on the vehicle will interfere with one another by the conduction of undesirable transients through common power lines, ground return cables, data lines or the like. A second reason for the increase in complexity arises because of the greater number of points which must be monitored simultaneously during a complete test, since even after a critical selection of monitor points, (i.e. points at which a transient could cause a malfunction in a system that is necessary for the flight to continue as planned) it is often necessary to monitor several hundred points.

In the past the monitoring of these points was accomplished by apparatus designed to detect only the amplitude of the transients and did not allow for the testing of the dynamic characteristics of the transient. Since a device such as a relay is responsive not only to the amplitude of a pulse applied to it but also to the width of the applied pulse little confidence could be given to the test results.

SUMMARY OF THE INVENTION

According to the present invention, it has been found that a detector can be made for testing the dynamic characteristics of a transient by applying the transient to an amplitude detector for deriving a pulse having a width equal to the time that the transient exceeds a predetermined critical amplitude. The leading edge of the pulse is then applied to a width generator which sets up a pulse having a predetermined critical width. The trailing edge of the width generator pulse and the pulse derived by the amplitude detector are then applied to a coincident circuit. If the transient pulse has a duration greater than that of the width of the pulse produced by the width generator, the coincidence circuit produces an output pulse indicating a "no-go" output.

Accordingly, one object of this invention is to provide a sensor for monitoring electrical devices having voltage time response characteristics.

Another object of this invention is to provide a sensor for detecting transients which exceed a specified pulse width and amplitude.

BRIEF DESCRIPTION OF THE DRAWINGS

These and other objects and advantages of this invention will be more apparent upon reference to the following specification, appended claims and drawings wherein:

FIG. 3 is a schematic illustration of the width detector stage of the system of FIG. 1.

DESCRIPTION OF THE EMBODIMENT

Figure 1:
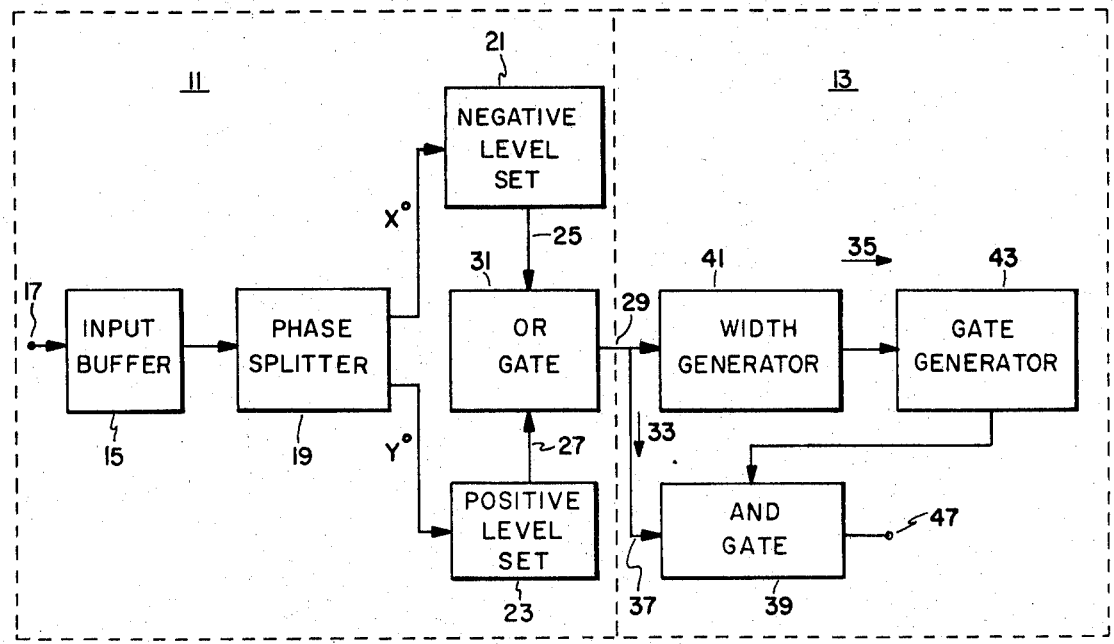
FIG. 1 is a block diagram of the sensor constructed in accordance with this invention wherein the blocks of the diagram represent the various elements of the system and the solid lines illustrate the manner in which the elements are electrically interconnected with one another to detect transients which exceed a specified amplitude and width.

Referring now to FIG. 1, the pulse amplitude and width evaluation system of the present invention, shown in block diagram form, includes an amplitude detector stage as indicated at 11 and a pulse width detector stage as indicated at 13. The amplitude detector stage includes an input buffer 15 having an input terminal 17 for receiving the pulse to be evaluated, and is arranged to attenuate and if necessary clip the incoming transient pulse to protect the amplitude detector from the possibility of a very large pulse.

To provide for the detection of transient pulses that exceed a predetermined amplitude in either the negative or positive direction, a phase splitter 19 is coupled to the attenuated output pulse of the input buffer. The phase splitter 19 is arranged to derive two signals $X^0$ and $Y^0$ that are out of phase by 180 degrees with respect to one another and which are representative of the amplitude and width of the transient pulse. The phase inverted pulses $X^0$ and $Y^0$ are respectively applied to the input of the negative and positive level set circuits 21 and 23.

In a manner to be more fully described hereinafter circuits 21 and 23 comprise trigger circuits, that have their respective threshold level adjusted to a predetermined amplitude of the same polarity. Thus, in operation because of the phase inversion of signals $X^0$ and $Y^0$, only one of the level set circuits will respond to any given transient pulse. Additionally, to provide for a logic input to the width detector stage 13, circuits 21 and 23 are designed when triggered to produce a pulse of the same polarity and amplitude. An OR gate 31 is provided for coupling the output leads 25 and 23 to the input circuit 29 of the width detector stage 13.

The width detector stage 13 comprises a pair of channels 33 and 35 connected in parallel. Channel 33 comprises lead 37 for directly applying the output of the amplitude detector stage 11 to the AND gate 39. Channel 35 comprises in cascade the width generator 41, the gate generator 43 and the AND gate 39. In operation, the width generator 41 is utilized to produce a pulse of predetermined width in response to the leading edge of the pulsed output of the amplitude detector stage 11 appearing on lead 29. The trailing edge of the output of the width generator is then utilized to trigger the gate generator so as to apply a pulse to and open the AND gate 39 a predetermined time after the width generator is triggered. Accordingly, if the output pulse from the amplitude detector stage 11 is still present on lead 37 during the time period when the AND gate is open, and AND gate produces an output which provides a Go/No Go output signal at output terminal 47.

Figure 2:
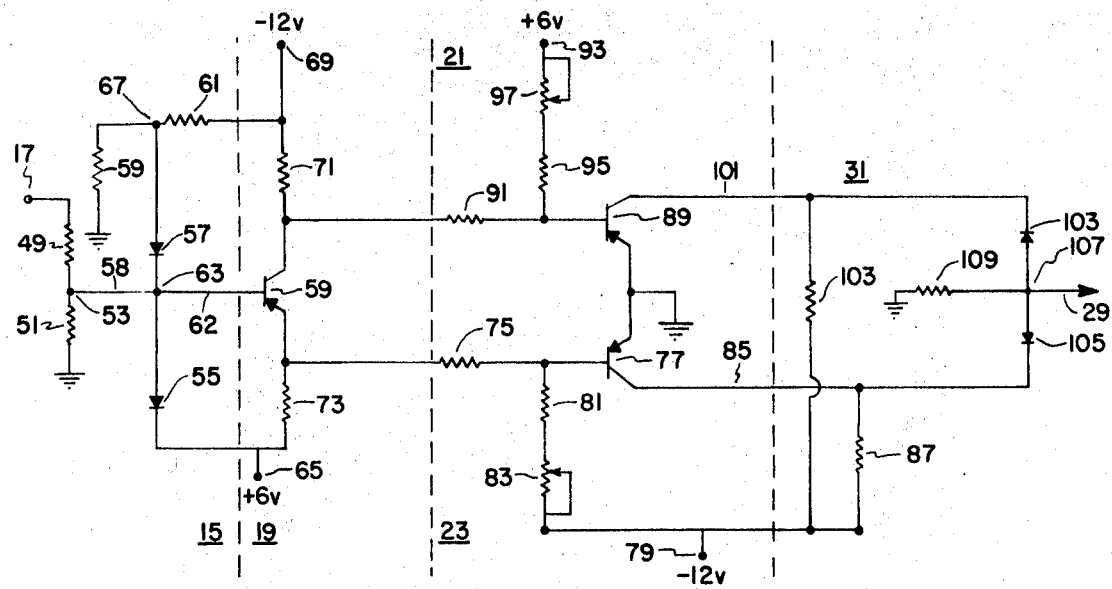
FIG. 2 is a schematic illustration of the amplitude detector stage of the system of FIG. 1.

FIG. 2 is a schematic circuit diagram of the amplitude detector stage 11 of the present invention. The input buffer 15 include the voltage divider network formed by the serial connection of resistances 49 and 51 between input terminal 17 and ground for providing an attenuated transient pulse at junction 53, which junction is coupled to the base of PNP transistor 59 via lead 58, junction 63, and lead 62 and forms the base bias on transistor 59. A diode clipping circuit consisting of diodes 55 and 57 and resistances 59 and 61 is provided to protect transistor 59 from the possibility of a very large transient.

As shown, the anode of diode 55 is connected to junction 53 via junction 63 and lead 58 while the cathode of diode 55 is connected to a suitable source of positive potential 65 such as +6 volts. The cathode of diode 57 is connected to junction 53 via junction 63 and lead 58 while the anode of diode 57 is connected to junction 67 of resistances 59 and 61, which resistances extend between ground and a source of negative potential 69, such as −12 volts. With resistances 59 and 61 of equal value, diodes 57 and 55 will limit the base voltage of transistor 59 to a suitable voltage, such as plus or minus 6 volts.

The phase splitter 19 is shown as a single stage phase inverter consisting of transistor 59, collector load resistor 71 and emitter load resistor 73. Resistor 71 is connected to the source of negative potential 69 while resistor 73 is connected to the source of positive potential 65. In the well known manner resistors 71 and 73 are selected to be of equal value so that the voltages appearing on the collector and the emitter of transistor 59 will be equal but will be 180 degrees out of phase with one another.

In the operation of the phase splitter circuit 19, transistor 59 in the quiescent state is forward biased. When a positive transient pulse is applied to input terminal 17 an attenuated positive pulse is applied to junction 63. This positive pulse decreases the forward bias of transisor 59 and accordingly there will be a decrease in the emitter collector current. This decrease in emitter collector current in turn causes a negative pulse to appear on the collector of transistor 59 and a positive pulse to appear on the emitter of transistor 59. Conversely, should negative transient pulse be applied to input terminal 17, the negative attenuated pulse appearing at junction 63 will increase the forward bias and the emitter collector current of transistor 59. The increase in emitter collector current in turn causes a positive pulse to appear on the collector of transistor 59 and a negative pulse to appear on the emitter of transistor 59.

The emitter of transistor 59, forming one output of the phase splitter 19, is coupled to the input of the positive level set circuit 23 by resistor 75 which couples the emitter of transistor 59 to the base of PNP transistor 77. The base of transistor 77 is additionally coupled to a source of negative voltage 79, such as −12 volts via the serial connection of resistor 81 and variable resistor 83. The collector of transistor 77 is connected to the source of negative potential 79 via lead 85 and resistor 87. The emitter of transistor 77 is connected to ground as shown. Resistors 81 and 83 function in connection with resistors 73 and 75 to establish an initial forward bias on transistor 77 so that in the quiescent state transistor 77 is saturated and its collector and output lead 85 are essentially at ground potential.

In operation, the collector of transistor 77 remains at essentially ground potential until a positive pulse of sufficient amplitude to overcome the forward bias is applied to the base of transistor 77. At the time that the critical potential is exceeded (determined by the setting of resisor 83) transistor 77 becomes non-conductive thereby lowering its collector potential to essentially that of the negative potential source 79. It is noted that transistor 77 is employed as a single stage Schmitt trigger and is only responsive to a positive transient pulse since a negative transient pulse will appear as a negative pulse on the emitter of transistor 59 and will merely drive transistor 77 further into saturation.

The negative level set circuit 21 is of similar construction and operation as the positive level set circuit 23 but is responsive to the collector voltage of transistor 59. As shown, the collector of transisor 59 is coupled to the base of PNP transistor 89 via resistor 91 and the base of transistor 89 is additionally coupled to a source of positive potential 93 such as +6 volts via resistor 95 and variable resistor 97. The collector of transistor 89 is coupled to the source of negative potential 79 via lead 101 and resistor 103. The emitter of transistor 89 is connected to ground as shown.

As with transistor 77, transistor 89 in the quiescent state is saturated and its collector and output lead 101 are maintained essentially at ground potential by the emitter based bias established by resistors 71, 91, 95, and 97. Thus, in operation, the collector of transistor 89 remains at essentially ground potential until a positive pulse appears on the collector of transistor 59 of sufficient amplitude to overcome the forward bias of transistor 89. At the time that the critical potential is exceeded (determined by the setting of resistor 97) transistor 89 becomes nonconductive thereby lowering its collector potential to essentially that of the negative potential source 79. It is noted that transistor 89 is only responsive to a negative transient pulse since a positive transient pulse will appear as a negative pulse on the collector of transistor 59 and will merely drive transistor 77 further into saturation.

As shown in FIG. 2, the "Or" gate 31 consists of diodes 103 and 105 having their respective anodes coupled to ground via junction 107 and resistor 109 and their cathodes coupled to the respective collectors of transistors 89 and 77 via leads 101 and 85. In the well known manner, the potential level of junction 107 is maintained at the lower of the voltage levels appearing on the collector of transistor 89 or the collector of transistor 77. Thus, in operation, junction 107 will normally be at ground potential since in the quiescent state transistors 89 and 77 are conducting and their collectors are held at ground potential. However, should either transistor 77 or transistor 89 be switched from the conductive state to the non-conductive state, junction 107 and output lead 29 will approach the negative potential source 79 value.

As shown in FIG. 3, output lead 29 of the amplitude detector stage 11 shown in FIG. 2, is coupled to the input circuit of the width generator 41 by coupling capacitor 113 and diode 115 which serially connects output lead 29 to the base of PNP transistor 117. The midpoint between capacitor 113 and diode 115 is connected to a source of positive potential 119, such as +6 volts, by resistor 121 and lead 122 and is also connected to ground by resistor 123. The collector of transistor 117 is connected to a negative source of potential 125, such as −12 volts, by resistor 127. The emitter of transistor 117 is connected to ground as shown.

The base of transistor 117 is connected to the positive voltage source 119 by resistor 129 and is also connected to collector of another PNP transistor 131 of the width generator 41 by resistor 133 having capacitor 135 connected thereacross. The collector of transistor 131 is coupled to the negative voltage source 125 by resistor 137 and the base of transistor 131 is connected to the collector of transistor 117 by variable capacitor 139 and is also connected to the midpoint of serially connected variable resistors 141 and 143, which resistors extend from the negative voltage source 125 and ground as shown.

It will be seen that with the circuity shown, the width generator 41 comprises a one-shot multivibrator arranged so that during the quiescent state transistor 117 is non-conducting and transistor 131 is conducting. The negative potential source 125 provides the collector bias voltages for transistors 117 and 131 and the forward bias for transistor 131 by the voltage divider network consisting of resistors 141 and 143. A reverse bias is provided to maintain transistor 117 cut-off by the serial connection of resistors 137, 133, and 129 between the negative potential source 125 and the positive potential source 119. It will thus be seen that in the absence of a negative pulse being impressed on lead 29 and with transistor 131 normally conducting, an appreciable voltage rise will occur across resistor 137. Therefore the collector of transistor 131 is essentially at ground potential, thus, providing a first output signal level on output terminal 145.

However, when a negative pulse is impressed on the input lead 29, the base of transistor 117 is driven negative causing transistor 117 to be turned on and causing transistor 131 to turn off in the well known manner. With transistor 131 cut-off, the potential of its collector lowers essentially to the value of the negative voltage source 125 and provides a negative going pulse at terminal 145 the length of which is determined by the time constant of variable resistors 143 and 141 and variable capacitor 139.

The output terminal 145 of the width generator 41 is coupled to the input of the gate generator 43 via coupling capacitor 147 which serially connects output terminal 145 to the base of PNP transistor 149. The midpoint between the capacitor 147 and the base of transistor 149 is connected to the source of negative potential source 125 by resistor 153 and capacitor 151 and the emitter of transistor 149 is coupled to ground. The base of transistor 149 is also connected to the midpoint of resistors 154 and 156 which extend between the negative potential source 125 and ground. The collector of transistor 149 is coupled to the base of PNP transistor 157 via resistor 159 having capacitor 161 connected thereacross. The base of transistor 157 is additionally coupled to the positive potential source 119 by resistor 163. The collector of transistor 157 is coupled to the midpoint between resistor 153 and capacitor 151 and the emitter is coupled to ground as shown.

It will be seen that with the circuity shown, the gate generator 43 comprises a one-shot multivibrator arranged so that immediately before transistor 131 returns to its conducting state, transistor 157 is cutoff and transistor 149 is conducting. The negative voltage source 125 provides the collector bias voltages for transistors 149 and 157 and the forward bias for transistor 149 is provided by resistors 154 and 156. Transistor 157 is provided with a reverse bias by resistors 155, 159, and 163. It will be seen that the lagging edge of the pulsed output of the width generator 41 appearing on terminal 145 appears as a positive going pulse at the base to transistor 149 that drives transistor 149 into non-conduction and in turn drives transistor 157 into conduction in the well known manner. Thus, with transistor 149 cutoff, the collector voltage of transistor 149 lowers to the value of the negative potential source 125 to produce a negative going pulse at terminal 158 having a width determined by the time constant of resistors 156 and 154 and capacitor 151.

To determine whether the negative output pulse appearing on lead 29 is still present when the negative going pulse appears on output terminal 158 of the gate generator 43 an AND gate 39 is provided. As shown the AND gate includes NPN transistor 167 having its base connected to lead 29 via lead 37, its collector coupled to the source of positive potential 119 via resistor 169 and its emitter coupled to the source of negative potential 171, such as −12 volts, via resistor 173. The output terminal 158 of the gate generator 43 is coupled to the emitter of transistor 167 via lead 175 and diode 177. The midpoint between the emitter of transistor 167 and resistor 173 is coupled to output terminal 47.

In the operation of the AND gate 39, output terminal 47 and the emitter of transistor 167, absent a pulsed output on either lead 37 or lead 175 are maintained at essentially ground potential due to the clamping action of diode 177 and the normally conducting transistor 149 of the gate generator 43. When the negative pulse of −12 volts is applied to lead 37, output terminal 47 will remain essentially at ground potential since diode 177 remains forward biased until the gate generator 43 is triggered and transistor 149 becomes non-conductive.

Also, if the gate generator 43 is triggered so as to apply a −12 volts pulse to lead 175, after the time period that the negative pulse is applied to lead 37, output terminal 47 will remain at ground potential due to the conduction of transistor 167 and the voltage dividing action of resistor 169 and 173. However, should a time coincidence occur between the negative pulse on lead 37 and the negative pulse on lead 175, diode 177 will be un-biased and output terminal 47 will go to the negative pulse level thereby indicating a No-Go condition. Thus, the output terminal 47 remains at ground potential until a time coincidence of the pulsed output of the amplitude detector stage 11 and the gate generator 43.

It will now be seen that the present invention provides very fast operation with digital accuracy and that the invention can be employed to evaluate pulses of any width or amplitude. It will further be seen that a Go/No-Go type output is obtained that may be easily stored if desired and read-out at any time after the evaluation is completed. It will also be seen that the pulse amplitude and width parameters can readily be changed by varying the threshold levels of the negative and positive level set circuits 21 and 27 and the time base of the width generator 41 so that the detector according to the present invention can easily be adapted to monitor devices having various voltage-time response characteristics.

While a particular embodiment of the present invention has been shown and described, it will be obvious to those skilled in the art that changes and modifications may be made without departing from this invention in its broader aspects and therefore the aim in the appended claims is to cover all such changes and modifications as fall within the true spirit and scope of the invention.

We claim:

1. An apparatus for detecting a pulse exceeding a predetermined amplitude and width comprising:

an input circuit for receiving an input pulse to be evaluated;

amplitude detecting means having an input coupled to said input circuit and having a signal output terminal for producing a first level output signal during the time interval that the amplitude of said input pulse exceeds a predetermined positive or negative amplitude and a second level output signal during the time interval that the amplitude of said input pulse is between said predetermined positive and negative amplitudes;

a width generator coupled to said signal output terminal of said amplitude detecting means for producing a timing pulse of predetermined width coincident with the initiation of said first level output signal;

a gate generator coupled to said width generator for producing a gating pulse coincident with the lagging edge of said timing pulse;

a coincident circuit havin a first input coupled to the output of said gate generator and a second input coupled to the output of said amplitude detecting means for producing an output pulse upon time coincidence of said first level output signal and said gating pulse.

2. A detector as claimed in claim 1 wherein said amplitude detector means includes:

(a) a first trigger circuit for producing said first level output signal when the input signal thereto exceeds a predetermined amplitude and said second level output signal when the input signal thereto is below said predetermined amplitude;
(b) a second trigger circuit for producing said first level output signal when the input signal thereto exceed a predetermined amplitude and said second level output signal when the input signal thereto is below said predetermined amplitude;
(c) a phase inverter interposed between said input circuit and said first and second trigger circuits for applying said input pulse in opposite polarity to said first and second trigger circuits; and
(d) an OR gate interposed between the outputs of said first and second trigger circuits for passing said first level output signal when present to said signal output terminal.

3. A detector as claimed in claim 2 wherein said phase inverter comprises a phase splitter.

4. A detector as claimed in claim 2 wherein said input circuit includes means for attenuating and clipping said input pulse.

5. A detector as claimed in claim 1 wherein said width generator and said gate generator respectively comprise a first and a second one-shot multivibrator.

References Cited

UNITED STATES PATENTS

| | | | |
|---|---|---|---|
| 2,777,059 | 1/1957 | Stites | 328—117 |
| 3,020,483 | 2/1962 | Losee | 328—109 |
| 3,095,541 | 6/1963 | Ashcraft | 328—115 |
| 3,259,842 | 7/1966 | Coulter | 328—117 |
| 3,310,758 | 3/1967 | Cottrell | 328—112 |

DONALD D. FORRER, Primary Examiner

D. M. CARTER, Assistant Examiner

U.S. Cl. X.R.

307—232; 328—112, 117